(12) United States Patent
Cingoz et al.

(10) Patent No.: US 9,977,311 B2
(45) Date of Patent: May 22, 2018

(54) OPTICAL COMB CARRIER ENVELOPE FREQUENCY CONTROL USING A ROTATING WAVEPLATE FREQUENCY SHIFTER

(71) Applicant: AOSense, Inc., Sunnyvale, CA (US)

(72) Inventors: Arman Cingoz, Sunnyvale, CA (US); Dmitriy Churin, San Jose, CA (US); Jonathan Roslund, Mountain View, CA (US); Miao Zhu, San Jose, CA (US)

(73) Assignee: AOSense, Inc., Sunnyvale, CA (US)

( * ) Notice: Subject to any disclaimer, the term of this patent is extended or adjusted under 35 U.S.C. 154(b) by 0 days. days.

(21) Appl. No.: 15/457,928

(22) Filed: Mar. 13, 2017

(65) Prior Publication Data

US 2017/0261832 A1 Sep. 14, 2017

Related U.S. Application Data

(60) Provisional application No. 62/308,155, filed on Mar. 14, 2016.

(51) Int. Cl.
*G02F 1/35* (2006.01)
*G02F 1/355* (2006.01)
*H01S 3/067* (2006.01)
*H01S 3/11* (2006.01)
*H01S 3/0941* (2006.01)
(Continued)

(52) U.S. Cl.
CPC ............ *G02F 1/353* (2013.01); *G02F 1/3501* (2013.01); *G02F 1/3544* (2013.01); *G02F 1/3551* (2013.01); *H01S 3/067* (2013.01); *H01S 3/0675* (2013.01); *H01S 3/06791* (2013.01); *H01S 3/0941* (2013.01); *H01S 3/106* (2013.01); *H01S 3/1106* (2013.01); *H01S 3/1112* (2013.01); *H01S 3/1608* (2013.01); *H01S 3/1618* (2013.01); *G02F 2203/56* (2013.01)

(58) Field of Classification Search
CPC ........................ G02F 2001/3546; G02F 1/3544
See application file for complete search history.

(56) References Cited

U.S. PATENT DOCUMENTS 8,743,919 B2 * 6/2014 Telle ..................... H01S 5/0085
372/20
8,971,358 B2 * 3/2015 Fermann ................. G02F 1/365
372/18

(Continued)

OTHER PUBLICATIONS

Benkler, et al., Endless Frequency Shifting of Optical Frequency Comb Lines, Optics Express, Mar. 11, 2013, 5793-5802, vol. 21, No. 5.
Buhrer et al., Optical Frequency Shifting by Electro-Optic Effect, Applied Physics Letters, Oct. 1, 1962, 46-49, vol. 1, No. 2.
Holzwarth et al., Optical Frequency Synthesizer for Precision Spectroscopy, Physical Review Letters, Sep. 11, 2000, 2264-2267, vol. 85, No. 11.

(Continued)

*Primary Examiner* — Rhonda Peace
(74) *Attorney, Agent, or Firm* — Van Pelt, Yi & James LLP

(57) ABSTRACT

A system for optical comb carrier envelope offset frequency control includes a mode-locked laser and a frequency shifter. The mode-locked laser produces a laser output. The frequency shifter shifts the laser output to produce a frequency shifted laser output based at least in part on one or more control signals. The frequency shifted laser output has a controlled carrier envelope offset frequency. The frequency shifter includes a first polarization converter, a rotating half-wave plate, and a second polarization converter.

25 Claims, 14 Drawing Sheets

(51) Int. Cl.
*H01S 3/106* (2006.01)
*H01S 3/16* (2006.01)
*G02F 2/02* (2006.01)

(56) References Cited

U.S. PATENT DOCUMENTS

| | | | |
|---|---|---|---|
| 8,976,823 B2* | 3/2015 | Xu | H01S 3/06712 |
| | | | 372/21 |
| 9,088,371 B2* | 7/2015 | Witzens | H04B 10/64 |
| 9,142,933 B2* | 9/2015 | Brons | H01S 3/23 |
| 9,653,868 B2* | 5/2017 | Fermann | H01S 3/0057 |
| 9,772,175 B2* | 9/2017 | Black | G01B 9/02001 |
| 9,787,051 B2* | 10/2017 | Fermann | H01S 3/1115 |
| 2002/0191285 A1 | 12/2002 | Damask | |
| 2008/0069491 A1 | 3/2008 | Kissa | |
| 2009/0092167 A1 | 4/2009 | Stingl | |
| 2009/0208200 A1 | 8/2009 | Takasaka | |
| 2011/0013262 A1 | 1/2011 | Zadoyan | |
| 2013/0308663 A1 | 11/2013 | Chen | |
| 2013/0329279 A1 | 12/2013 | Nati | |
| 2014/0064734 A1 | 3/2014 | Witzens | |
| 2014/0185635 A1 | 7/2014 | Cox | |
| 2015/0160532 A1 | 6/2015 | Fermann | |
| 2015/0333475 A1 | 11/2015 | Blumenthal | |
| 2016/0054639 A1 | 2/2016 | Kono | |

OTHER PUBLICATIONS

Hudson et al., Mode-Locked Fiber Laser Frequency-Controlled with an Intracavity Electro-Optic Modulator, Optics Letters, Nov. 1, 2005, 2948-2950, vol. 30, No. 21.

Jones et al., Carrier-Envelope Phase Control of Femtosecond Mode-Locked Lasers and Direct Optical Frequency Synthesis, Science, Apr. 28, 2000, 635-639, vol. 288.

Karlen et al., Efficient Carrier-Envelope Offset Frequency Stabilization through Gain Modulation via Stimulated Emission, Optics Letters, Jan. 15, 2016, 376-379, vol. 41, No. 2.

Koke et al., Direct Frequency Comb Synthesis with Arbitrary Offset and Shot-Noise-Limited Phase Noise, Nature Photonics, Jul. 2010, 462-465, vol. 4, Macmillan Publishers Limited.

Lee et al., Frequency Comb Stabilization with Bandwidth Beyond the Limit of Gain Lifetime by an Intracavity Graphene Electro-Optic Modulator, Optics Letters, Aug. 1, 2012, 3084-3086, vol. 37, No. 15.

Sinclair et al., Operation of an Optically Coherent Frequency Comb Outside the Metrology Lab, Optics Express, Mar. 24, 2014, 6996-7006, vol. 22, No. 6.

Udem et al., Optical Frequency Metrology, Nature, Mar. 14, 2002, 233-237, vol. 416, Macmillan Magazines Ltd.

Zhang et al., Steering Optical Comb Frequency by Rotating Polarization State, https://arxiv.org/abs/1603.09500, Mar. 31, 2016.

* cited by examiner

OPTICAL COMB CARRIER ENVELOPE FREQUENCY CONTROL USING A ROTATING WAVEPLATE FREQUENCY SHIFTER

CROSS REFERENCE TO OTHER APPLICATIONS

This application claims priority to U.S. Provisional Patent Application No. 62/308,155 entitled HIGH BANDWIDTH ACTUATOR FOR FREQUENCY COMB CARRIER-ENVELOPE OFFSET CONTROL filed Mar. 14, 2016 which is incorporated herein by reference for all purposes.

BACKGROUND OF THE INVENTION

Femtosecond optical frequency combs have led to a revolution in optical metrology, spectroscopy and frequency standards by providing a precise ruler to measure optical frequencies. An optical frequency comb consists of a mode-locked femtosecond laser that is actively stabilized to generate a stable optical pulse train. The optical spectrum of the resultant laser output consists of tens of thousands of equally spaced narrow linewidth "comb-teeth", with typical spacing between each teeth of 0.1-1 GHz. The absolute frequency and linewidth of each tooth is determined by two parameters: the laser cavity length, which determines the spacing between the teeth, and the carrier-envelope phase offset frequency (fceo), which determines the absolute frequency of the central comb tooth. High speed control of both of these parameters is important to reduce the linewidth of each comb tooth and minimize the error in optical frequency determination.

BRIEF DESCRIPTION OF THE DRAWINGS

Various embodiments of the invention are disclosed in the following detailed description and the accompanying drawings.

DETAILED DESCRIPTION

Figure 1:
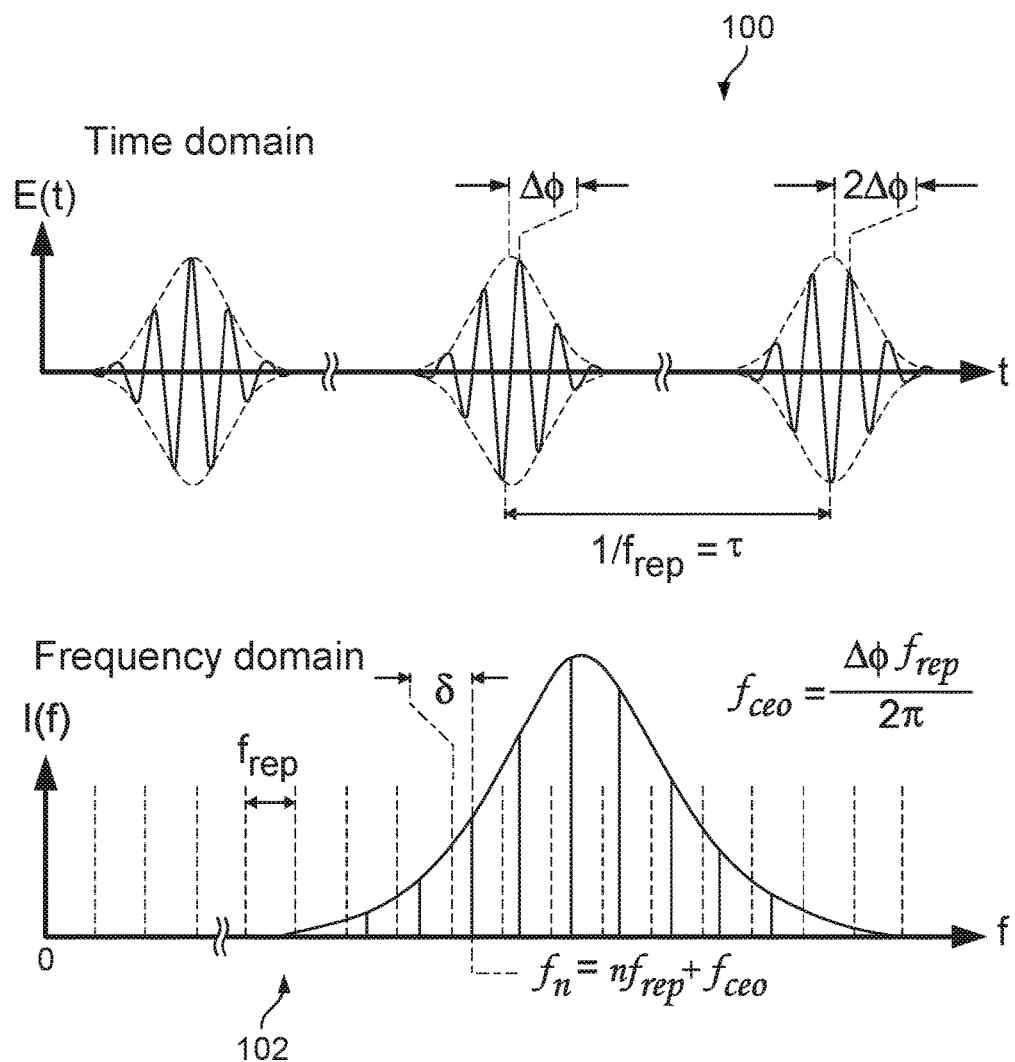
FIG. 1 is a diagram illustrating an embodiment of time and frequency domain plots for a laser frequency comb.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for optical comb carrier envelope offset frequency control comprises a mode-locked laser, wherein the mode-locked laser produces a laser output, and a frequency shifter, wherein the frequency shifter shifts the laser output to produce a frequency shifted laser output based at least in part on one or more control signals, wherein the frequency shifted laser output comprises a controlled carrier envelope offset frequency, and wherein the frequency shifter comprises a first polarization converter, a rotating half-wave plate, and a second polarization converter. In some embodiments, the system additionally comprises a beat note generator, wherein a portion of the frequency shifted laser output is used to produce an optical beat note, and a control signal generator, wherein the control signal generator produces the one or more control signals to control the optical beat note.

In some embodiments, a system for optical comb carrier envelope frequency control comprises a mode-locked laser and a frequency shifter that is external from the mode-locked laser cavity. The mode-locked laser produces a laser frequency comb (e.g., an optical pulse train). The frequency shifter shifts the carrier frequency of the laser light without changing the time between pulses, allowing the carrier envelope offset frequency (e.g., $f_{ceo}$) to be controlled (and stabilizing the optical pulse train). The frequency shifter comprises a first polarization converter (e.g., a quarter-wave plate) for converting polarized light (e.g., a linear polarized light) to circular polarized light (or, more generally, elliptical polarized light), a rotating half-wave plate for frequency shifting the circular polarized light, and a second polarization converter (e.g., a quarter waveplate) for converting frequency shifted circular polarized light to polarized light (e.g., a linear polarized light). The frequency shift applied by the frequency shifter comprises twice the rotational frequency of the rotating half-wave plate. In some embodiments, the rotating half-wave plate is implemented using an electro-optic crystal for applying a phase shift proportional to an applied transverse electric field. Oscillating electric fields are applied to the crystal in the horizontal and vertical directions transverse to the direction of travel of light through the crystal, causing the phase shifts applied by the crystal to match those of a physically rotating half-wave plate. In some embodiments, a fiber-coupled electro-optic crystal is used in order to realize the rotating half-wave plate with low insertion loss.

In some embodiments, the first quarter-wave plate is a polarization converter (or a waveplate with an appropriate retardance angle) to convert the polarization of the mode-lock laser output to a circular polarization. In some embodiments, the second quarter-wave plate is a polarization converter (or a waveplate with an appropriate retardance angle) to convert the circular polarization after the rotating half-wave plate to a polarization defined by the requirement of the user.

In some embodiments, a system for optical comb carrier envelope frequency control comprises a feedback loop. In some embodiments, the feedback loop comprises a beat detector for determining an $f_{ceo}$ from a laser frequency comb and a control signal generator for generating one or more control signals to stabilize the $f_{ceo}$ to a desired value. In some embodiments, the control signal generator comprises a phase-locked loop. In some embodiments, the control signal generator provides control signals comprising two voltages for generating the two oscillating electric fields in the electro-optic crystal to cause it to emulate a rotating half-wave plate.

In some cases, control of the $f_{ceo}$ uses either pump laser power (either directly via current modulation or through an optical amplitude modulator) or an optoelectronic modulator external to the laser cavity, such as an acousto-optic modulator (e.g., AOM) or an electro-optic phase modulator (e.g., EOM) utilizing serrodyne modulation.

As a comparison, the disclosed has an advantage over an extra-cavity AOM for various reasons including that in addition to frequency shifting, an AOM also leads to wavelength- and frequency-dependent beam deflection. As a result, it is very difficult to implement in a fiber-coupled design with low insertion loss. A fiber-coupled device is more desirable since it is less susceptible to vibrations and temperature induced misalignments. In contrast to using the AOM, the electro-optic polarization controller does not deflect the beam and can be integrated in a fiber-coupled device. In some embodiments, the electro-optic polarization controller is a waveguide-based device, which also reduces the drive power requirements compared to an AOM.

As another comparison, the disclosed has an advantage over an extra-cavity electro-optic phase modulator utilizing serrodyne modulation for various reasons including the reason that the serrodyne modulation requires a saw tooth waveform, which is difficult to implement at frequency shifts >10 MHz. Moreover, the imperfections in the waveform as the voltage returns from its maximum value back to zero lead to imperfections in the frequency shift, which result in some of the light to remain at the original, un-shifted frequency. In contrast, the electro-optic polarization controller utilizes a sinusoidal frequency that is easy to generate with low spur content. As a result, the disclosed shifts essentially all of the light into the new frequency.

As another comparison, the disclosed has an advantage over pump power modulation for various reasons including that because the pump laser affects the mode-locked laser via modulation of the gain medium, its actuation bandwidth is limited by the upper-state lifetime of the gain medium. This is particularly troublesome, for example, for erbium-based fiber frequency combs where the upper-state lifetime introduces a 10-30 kHz pole in the transfer function. This is important since erbium fiber frequency combs are the most robust implementation of frequency combs to date and have the most commercial relevance. Moreover, the modulation of the pump power degrades the laser performance by inducing residual intensity noise on the power output of the frequency comb. In contrast, the extra-cavity rotating wave frequency shifter is not limited by the laser dynamics, can achieve bandwidth >10 MHz, and does not introduce intensity modulation.

FIG. 1 is a diagram illustrating an embodiment of time and frequency domain plots for a laser frequency comb. In the example shown, time domain plot 100 comprises a time domain plot of a laser frequency comb. The laser frequency comb comprises a set of laser pulses (e.g., laser pulses comprising an envelope shaping the amplitude of laser light). The laser pulses are spaced in time by a time $\tau=1/f_{rep}$, where $f_{rep}$ is the pulse repetition frequency. A phase shift $\Delta\varphi$ is defined, wherein $\Delta\varphi$ equals the carrier envelope phase shift that occurs during time $\tau$ (e.g., the carrier phase shift relative to a constant point within the envelope, from a first pulse to a second pulse). The phase shift $\Delta\varphi$ is stable when the $f_{ceo}$ has been stabilized. Frequency domain plot 102 comprises a frequency domain plot corresponding to a frequency analysis of time domain plot 100. Frequency plot 102 comprises a plurality of frequency spikes, wherein the $n^{th}$ frequency spike is at frequency $f_n=nf_{rep}+f_{ceo}$, wherein n is an integer in the order of magnitude of millions (e.g., $10^5$, $10^6$, etc.). The carrier envelope offset frequency $f_{ceo}$ is defined as $$f_{ceo} = \frac{\Delta\phi f_{rep}}{2\pi}.$$

Note in frequency plot 102, $\delta=f_{ceo}$.

Figure 2:
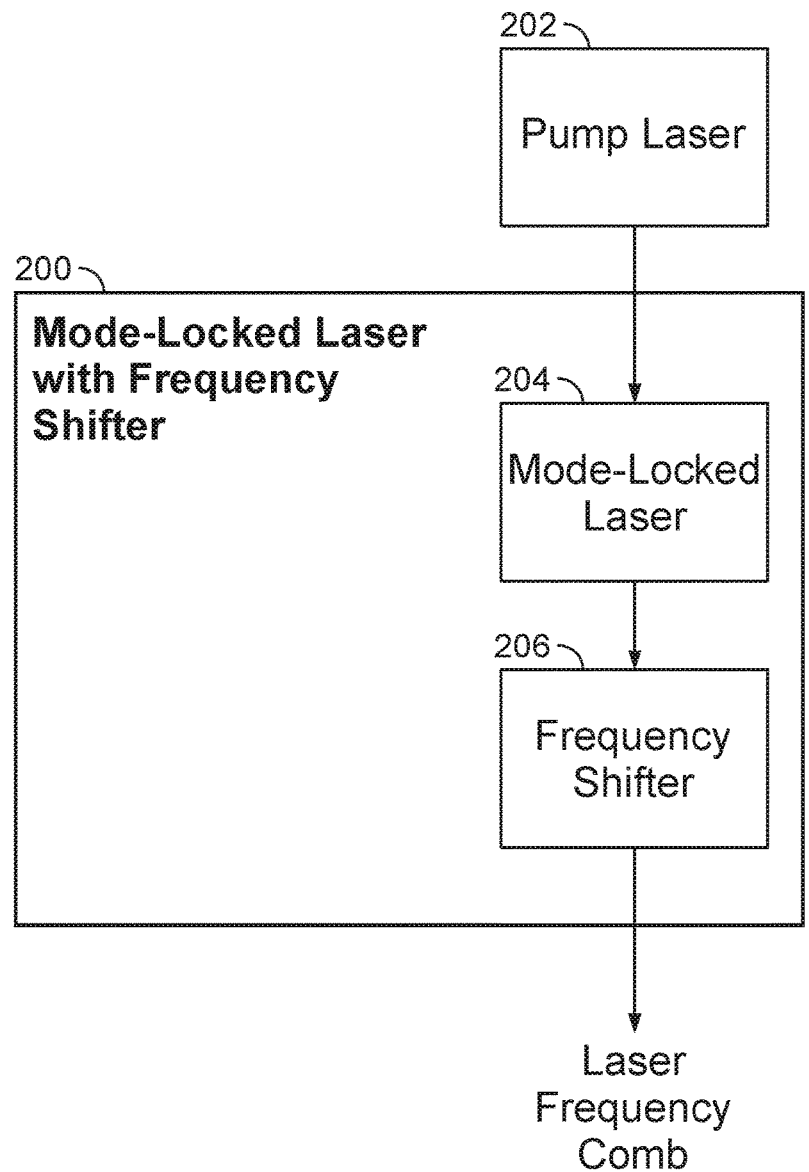
FIG. 2 is a block diagram illustrating an embodiment of a mode-locked laser with a frequency shifter.

FIG. 2 is a block diagram illustrating an embodiment of a mode-locked laser with a frequency shifter. In the example shown, mode-locked laser with frequency shifter 200 comprises mode-locked laser 204 and frequency shifter 206. Mode-locked laser 204 is pumped by pump laser 202. In various embodiments, pump laser 202 comprises a laser diode, a gas laser, a solid-state laser, or any other appropriate laser type. Mode-locked laser 204 comprises a mode-locked laser (e.g., a laser comprising a resonating cavity including a pulse-forming element for producing a stable repeating laser pulse). Mode-locked laser 204 outputs a series of laser pulses (e.g., a laser frequency comb). In various embodiments, mode-locked laser 204 comprises a dye laser, a solid-state laser, a fiber laser, a semiconductor laser, or any other appropriate laser. In various embodiments, mode-locked laser 204 comprises a linear cavity, a ring cavity, a FIG. 8 cavity, a sigma cavity, or any other appropriate cavity. Frequency shifter 206 comprises a frequency shifter for shifting the frequency of laser pulses emitted by mode-locked laser 204. In various embodiments, frequency shifter 206 comprises a rotating waveplate frequency shifter, an acousto-optic frequency shifter, or any other appropriate frequency shifter. Frequency shifter 206 outputs a series of pulses comprising the series of pulses output by mode-locked laser 204 having undergone a laser frequency shift. In some embodiments, frequency shifter 206 receives an input signal to adjust the frequency shift amount.

Figure 3A:
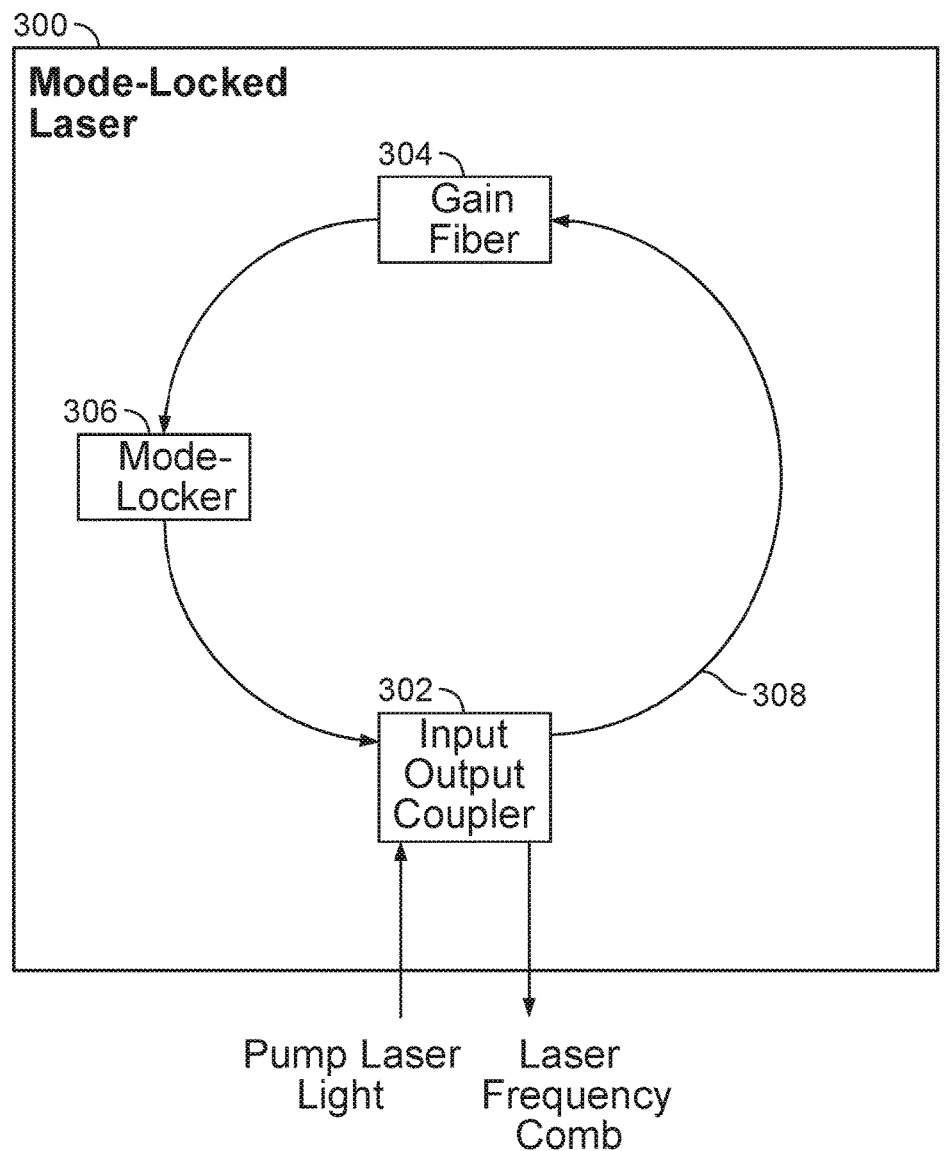
FIG. 3A is a block diagram illustrating an embodiment of a mode-locked laser.

FIG. 3A is a block diagram illustrating an embodiment of a mode-locked laser. In some embodiments, mode-locked laser 300 comprises mode-locked laser 204 of FIG. 2. In the example shown, mode-locked laser 300 comprises a set of elements coupled into a loop using optical fibers (e.g., optical fiber 308). Mode-locked laser 300 comprises input output coupler 302. Input output coupler 302 comprises an input output coupler for coupling input light (e.g., pump laser light, e.g., from pump laser 202 of FIG. 2) into the fiber loop and for coupling output light (e.g., the output laser frequency comb) out from the fiber loop. In some embodiments, input output coupler 302 comprises a beam splitter. In some embodiments, input output coupler are two stand-alone components: an input coupler and an output coupler. Gain fiber 304 comprises a gain fiber for providing optical signal gain. In some embodiments, gain fiber 304 comprises a rare-earth element (e.g., erbium, ytterbium, thulium, etc.) doped fiber. Mode-locker 306 comprises a mode-locker for shaping an optical pulse. In various embodiments, mode-locker 306 comprises a passive modelocking mechanism such as saturable absorber, saturable absorber mirror, Kerr lensing, nonlinear polarization rotation, nonlinear loop mirror, or any other appropriate mode locker.

Figure 3B:
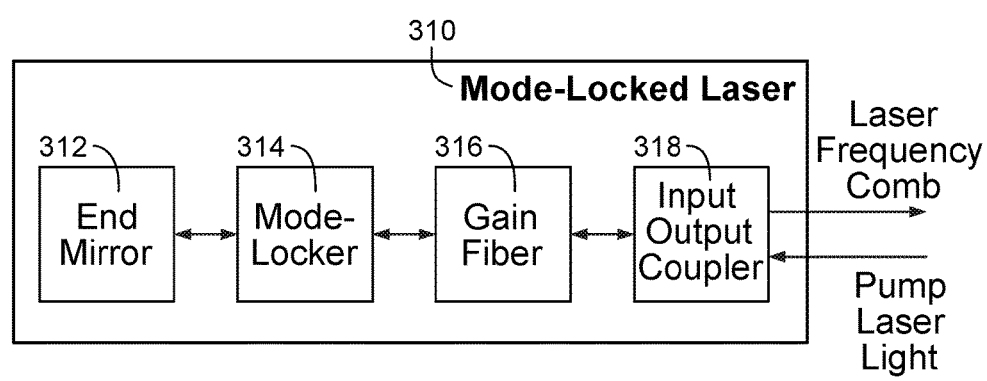
FIG. 3B is a block diagram illustrating an embodiment of a mode-locked laser.

FIG. 3B is a block diagram illustrating an embodiment of a mode-locked laser. In the example shown, a linear optical cavity is used for the mode-locked laser (e.g., mode-locked laser 310). Mode-locked laser 310 comprises a set of elements coupled in a row using optical fibers. Mode-locked laser 300 comprises input output coupler 318. Input output coupler 318 comprises an input output coupler for coupling input light such as pump laser light (e.g., from pump laser 202 of FIG. 2) into mode-lock laser 310 and for coupling output light (e.g., the output laser frequency comb) out from mode-locked laser 310. In some embodiments, input output coupler 318 comprises a beam splitter. In some embodiments, the input output coupler comprises a Bragg reflector. In some embodiments, input output coupler 318 is implemented using two standalone components: an input coupler and an output coupler. Gain fiber 316 comprises a gain fiber for providing optical signal gain. In some embodiments, gain fiber 316 comprises a rare-earth element (e.g., erbium, ytterbium, thulium, etc.) doped fiber. Mode-locker 314 comprises a mode-locker for shaping an optical pulse. In various embodiments, mode-locker 314 comprises a passive modelocking mechanism such as saturable absorber, saturable absorber mirror, Kerr lensing, nonlinear polarization rotation, nonlinear loop mirror, or any other appropriate mode locker. End mirror 312 completes the laser cavity by retro-reflecting intracavity light through the rest of the laser cavity. In various embodiments, the order of the gain fiber 316 and mode-locker 314 may be switched.

Figure 4:
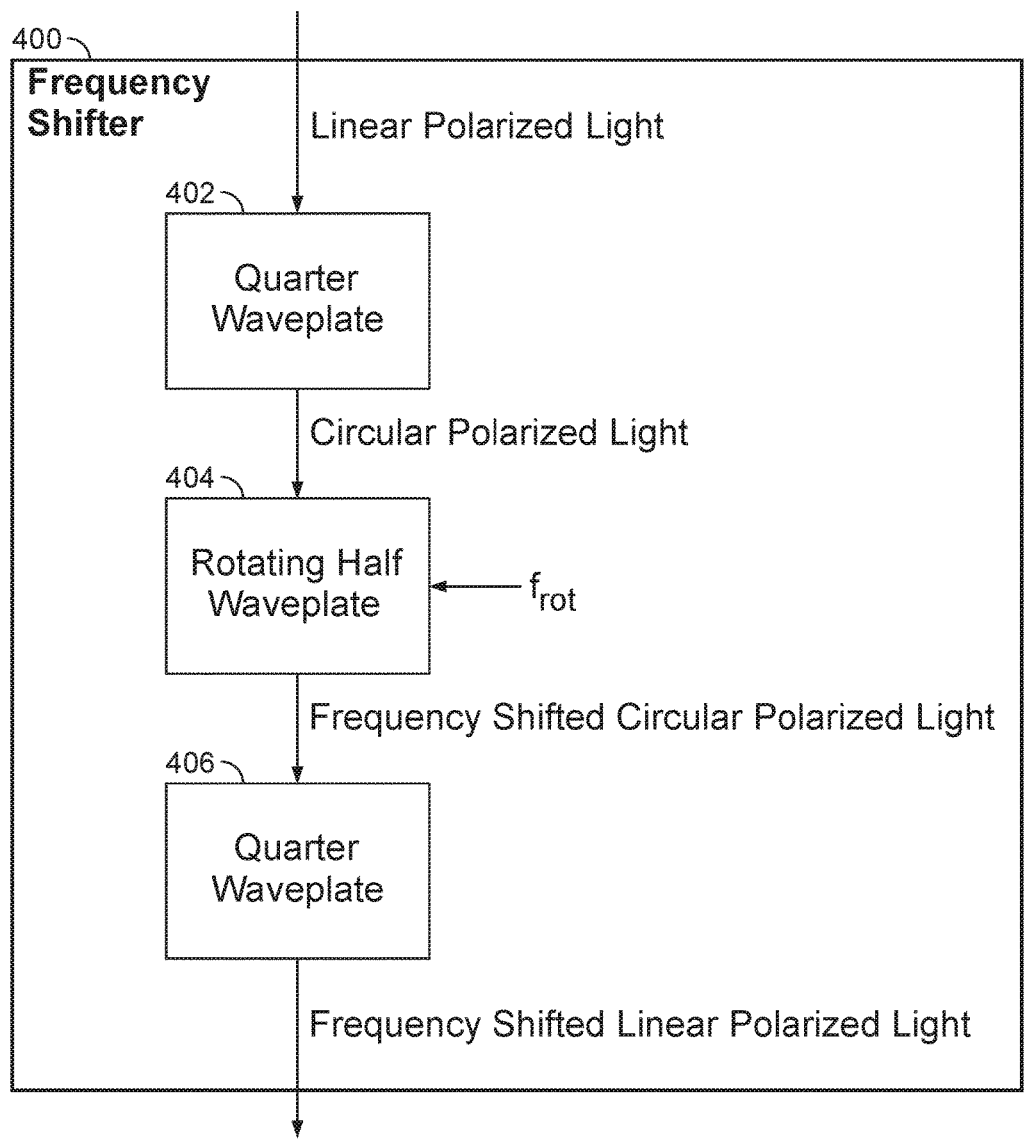
FIG. 4 is a block diagram illustrating an embodiment of a frequency shifter comprising a rotating waveplate.

FIG. 4 is a block diagram illustrating an embodiment of a frequency shifter comprising a rotating waveplate. In some embodiments, frequency shifter 400 comprises frequency shifter 206 of FIG. 2. In the example shown, frequency shifter 400 comprises quarter-wave plate 402, rotating half-wave plate 404, and quarter-wave plate 406. Linear polarized light is received from a mode-locked laser (e.g., mode-locked laser 204 of FIG. 2). In some embodiments, light received from the mode-locked laser is polarized with a linear polarizer to form linear polarized light. The linear polarized light passes through quarter-wave plate 402. Quarter-wave plate 402 comprises a quarter-wave plate (e.g., an optical device with index of refraction dependent on the polarization direction, chosen such that the relative phase shift of horizontally polarized light and vertically polarized light passing through the device is one quarter the wavelength at an optical frequency of interest). In various embodiments, a quarter-wave plate converts linear polarized light to circular polarized light (e.g. for light at a specific frequency and when the quarter-wave plate is positioned with its axis 45 degrees to the polarization axis of the incoming light), linear polarized light to elliptical polarized light, circular polarized light to linear polarized light, or performs any other appropriate conversion. Quarter-wave plate 402 is chosen and positioned in order to convert light from a mode-locked laser to circular polarization. Rotating half-wave plate 404 comprises a rotating half-wave plate (e.g., a waveplate chosen such that the relative phase shift of horizontally polarized light and vertically polarized light passing through the device is one half the wavelength at an optical frequency of interest). The fast axis of the rotating half-wave plate 404 is rotating at a frequency $f_{rot}$, about an axis parallel to the direction of light propagation. In some embodiments, $f_{rot}$ comprises a frequency that can be changed according to a control signal. In some embodiments, rotating half-wave plate 404 is implemented using an electro-optic modulator (e.g., a crystal with index of refraction dependent on an applied electric field in one or more axes). When circular polarized light passes through rotating half-wave plate 404, its frequency is shifted by $2*f_{rot}$. The frequency shifted circular polarized light passes through quarter-wave plate 406 and becomes linear polarized, retaining the $2*f_{rot}$ frequency shift.

In some embodiments, the individual components of the shifter can be realized in a variety of ways. In various embodiments, the frequency shifter can be constructed using bulk quarter-wave plates and an electro-optic (e.g., EO) crystal; using a fiber coupled waveguide EO polarization controller with n-stages (these are commercially available at erbium laser wavelengths)—the first and last stages of the controller can be biased to generate the quarter-wave plates and the middle (n−2) stages can be used to generate the rotating wave plate; using zero-order quarter-wave plates in free space coupling sections of a waveguide EO polarization controller, where all the stages are used for generating the rotating waveplate, or any other appropriate way.

In some embodiments, the quarter-wave plates are a generalized polarization converter depending on the mode-locked laser output polarization and are selected to convert the mode-locked laser output to circular polarization and convert back after rotation by the rotating half-wave polarizer.

Figure 5:
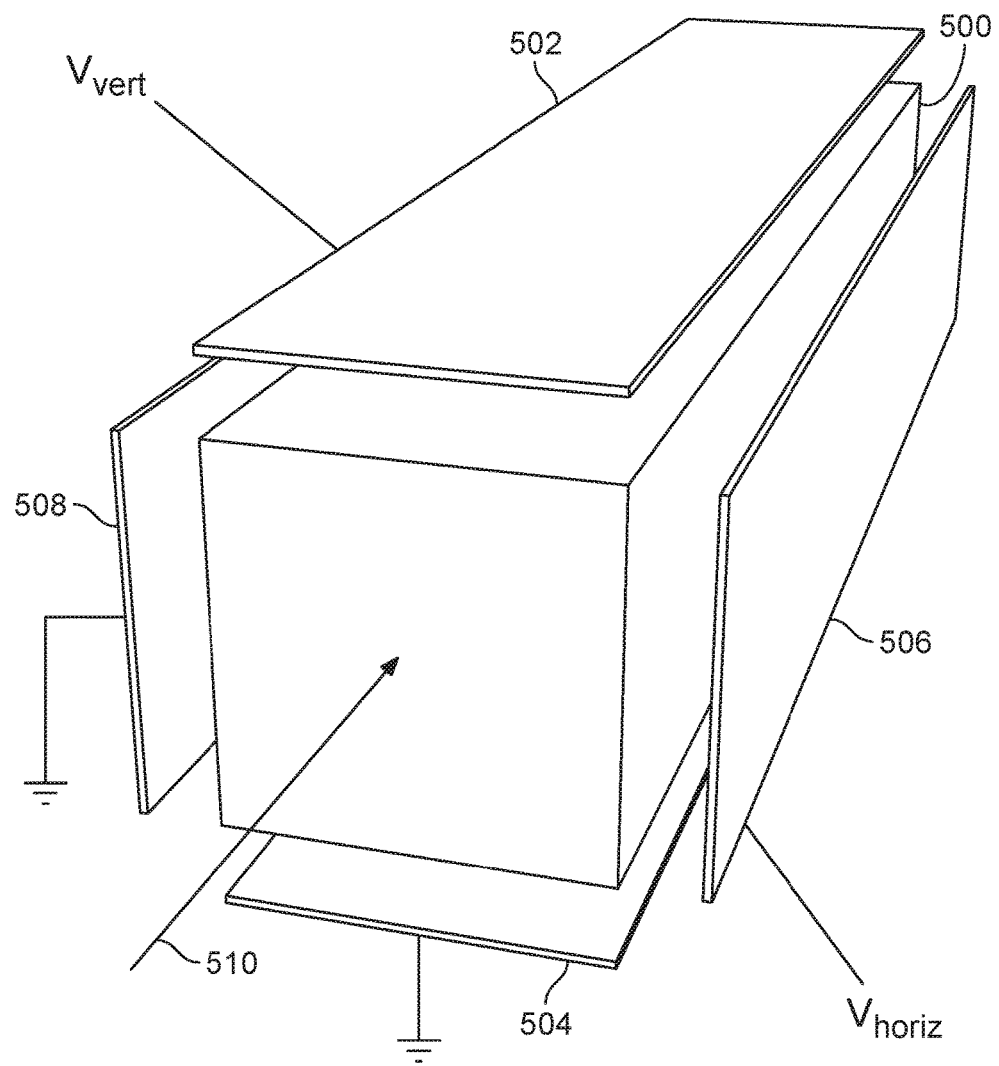
FIG. 5 is a diagram illustrating an embodiment of an electro-optic crystal.

FIG. 5 is a diagram illustrating an embodiment of an electro-optic crystal. In some embodiments, electro-optic crystal 500 of FIG. 5 comprises rotating half-waveplate 404 of FIG. 4. In some embodiments, electro-optic crystal 500 of FIG. 5 comprises a Pockels cell. In the example shown, light passes through electro-optic crystal 500 in the direction indicated by arrow 510. Electrode 502, electrode 504, electrode 506, and electrode 508 are placed around electro-optic crystal 500 such that a first voltage placed between electrode 502 and electrode 504 creates a first electric field transverse to the direction of light propagation, and a second voltage placed between electrode 506 and electrode 508 creates a second electric field transverse to the direction of light propagation and to the first electric field. In the example shown, electrode 504 and electrode 508 are both held at ground potential. In some embodiments, the voltages are not relative to ground, but instead the electrode pairs (e.g., electrode 508 and electrode 506 or electrode 504 and electrode 502) have a potential between them and either float or have any other arbitrary ground. A control voltage for controlling a vertical electric field, $V_{vert}$, is placed on electrode 502, and a control voltage for controlling a horizontal electric field, $V_{horiz}$, is placed on electrode 506.

In some embodiments, in order to cause electro-optic crystal 500 to emulate a rotating waveplate, the following voltages are applied:

$$V_{horiz} = V_\pi \sin(2\pi(f_{rot})t)$$

$$V_{vert} = V_\pi \cos(2\pi(f_{rot})t)$$

wherein $V_\pi$ is the voltage required to induce a 180 degree phase shift between the TE and TM modes.

Figure 6:
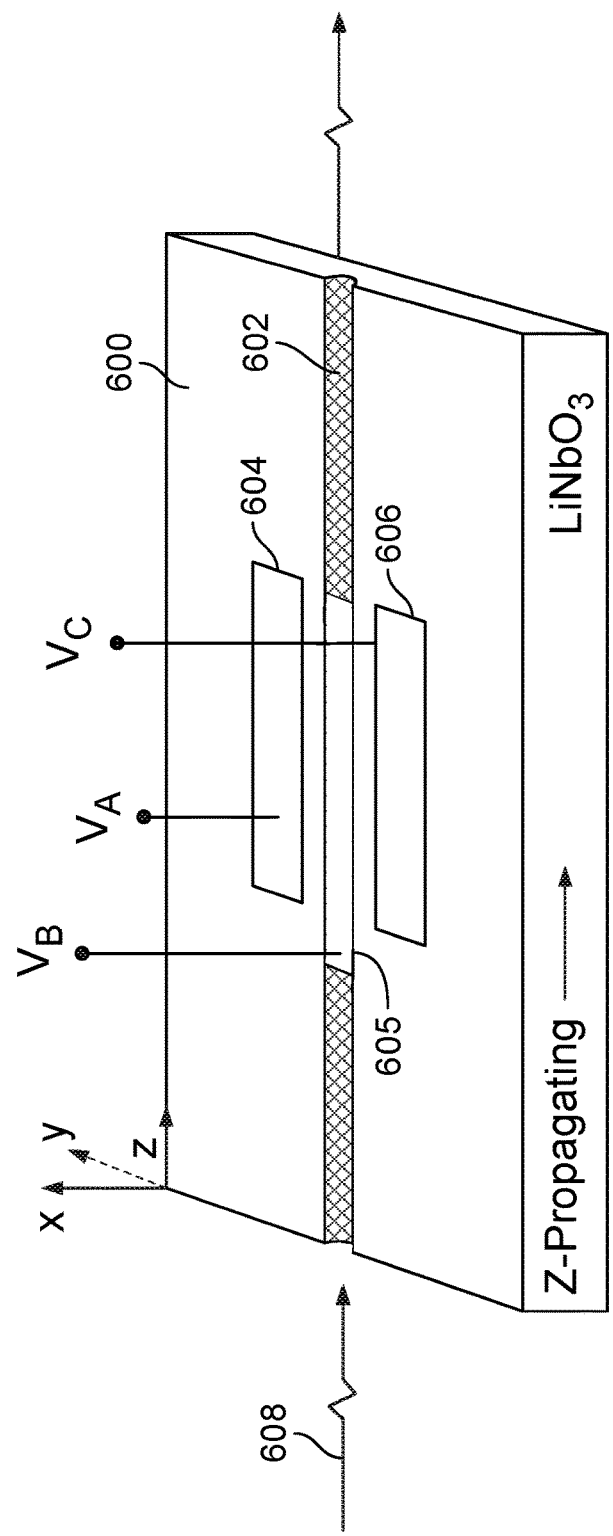
FIG. 6 is a diagram illustrating an embodiment of a waveguide electro-optic polarization controller.

FIG. 6 is a diagram illustrating an embodiment of a waveguide electro-optic polarization controller. In some embodiments, waveguide electro-optic controller 600 comprises rotating half-wave plate 404 of FIG. 4. In the example shown, waveguide electro-optic controller comprises a crystal (e.g., a lithium niobate crystal). Waveguide 602 comprises a doped region for light propagation (e.g., a region doped with titanium). Light propagates through waveguide 602 in the direction indicated by arrow 608. Electrode 604, electrode 605, and electrode 606 are placed next to waveguide 602 such that a voltage applied to electrode 604, electrode 605, and electrode 606 creates electric fields transverse to the direction of light propagation. In some embodiments, $V_A$ and $V_C$ defined below are applied to electrodes 604 and 606 with electrode 605 held at ground to generate the vertical and horizontal fields. The wafer is an x-cut, z-propagating crystal substrate (i.e., the wafer is cut along a plane perpendicular to the x-axis, and the waveguide direction is along the z-axis). This geometry provides electro-optic polarization control that is wavelength-independent, temperature insensitive (because both TE and TM modes see the ordinary index of refraction), improves optical power handling (photorefractive effect is minimized), and allows for better waveguide mode matching to optical fibers (lowers insertion loss). With the given electrode geometry, the electric field in the x-direction (vertical in FIG. 6) is due to the sum of $V_A$ and $V_C$, while the electric field in the y-direction (into the page in FIG. 6) is provided by the difference between $V_A$ and $V_C$.

In some embodiments, in order to cause electro-optic crystal 600 to emulate a rotating waveplate, the following voltages are applied:

$$V_A = \sqrt{V_0^2 + \frac{V_\pi^2}{4}} \sin(2\pi(f_{rot})t + \psi) + V_{bias}^A$$

$$V_C = \sqrt{V_0^2 + \frac{V_\pi^2}{4}} \sin(2\pi(f_{rot})t - \psi) + V_{bias}^C$$

wherein $V_0$ is the voltage required to rotate all power from TE to the TM mode, $V_\pi$ is the voltage required to induce a 180 degree phase shift between the TE and TM modes, $V_{bias}^A$ and $V_{bias}^C$ are the static bias voltages needed to achieve zero birefringence, and $$\psi = \tan^{-1}\left(-\frac{V_\pi}{2V_0}\right).$$

Figure 7:
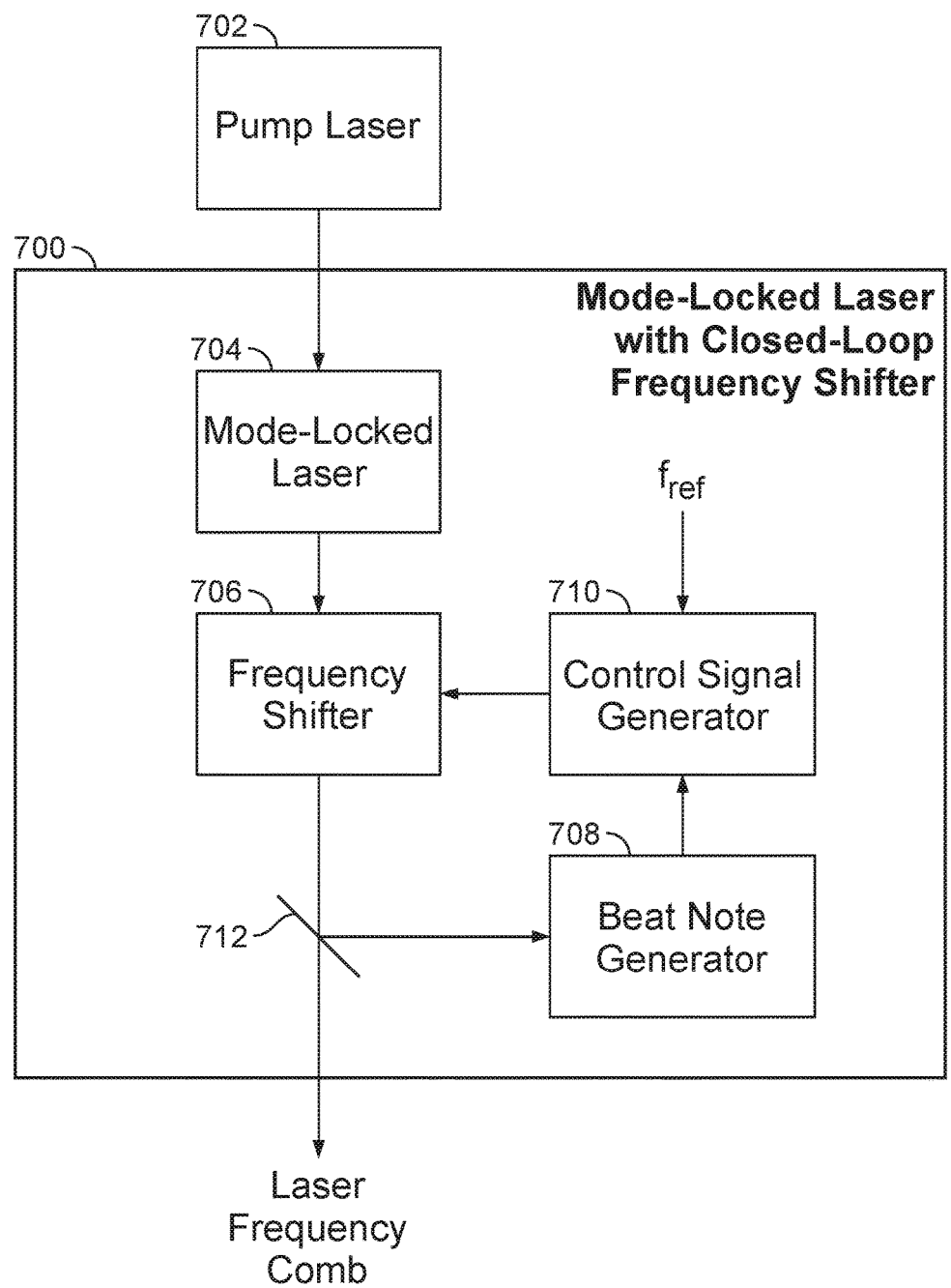
FIG. 7 is a block diagram illustrating an embodiment of a mode-locked laser with a closed-loop frequency shifter.

FIG. 7 is a block diagram illustrating an embodiment of a mode-locked laser with a closed-loop frequency shifter. In some embodiments, mode-locked laser with closed-loop frequency shifter 700 comprises mode-locked laser with frequency shifter 200 of FIG. 2 including feedback electronics. In the example shown, pump laser 702 provides laser light to pump mode-locked laser 704. Mode-locked laser 704 creates a laser frequency comb in response to the pump laser light and provides the frequency comb to frequency shifter 706. In various embodiments, mode-locked laser 704 comprises mode-locked laser 300 of FIG. 3A or mode-locked laser 310 of FIG. 3B. In some embodiments, frequency shifter 706 comprises frequency shifter 400 of FIG. 4. The laser frequency comb output by frequency shifter 706 is split by beam splitter 712. A portion of the light is output as the mode-locked laser with closed-loop frequency shifter laser frequency comb output, and a portion of the light is provided to beat note generator 708 for creation of a feedback control signal. In various embodiments, half of the light is output and half is fed back, 75% is output and 25% is fed back, 90% is output and 10% is fed back, 99% is output and 1% is fed back, or the light is split in any other appropriate way. Beat note generator 708 comprises a beat note generator for extracting a carrier envelope offset frequency from a laser frequency comb. In some embodiments, beat note generator 708 extracts a carrier envelope offset frequency from a laser frequency comb by comparing the laser frequency comb with a frequency doubled version of itself. The carrier envelope offset frequency is provided to control signal generator 710. Control signal generator 710 receives the carrier envelope offset frequency and a reference frequency comprising the desired carrier envelope offset frequency and generates a control signal for providing to frequency shifter 706 in order to stabilize the carrier envelope offset frequency to a controlled carrier envelope offset frequency. In some embodiments, control signal generator 710 creates more than one control signal (e.g., two control signals, three control signals, etc.). In some embodiments, the control signal or signals comprise sinusoidal (e.g., oscillating) signals for applying a sinusoidal electric field to an electro-optic crystal. In some embodiments, control signal generator 710 comprises a phase-locked loop. In some embodiments, control signal generator 710 additionally produces a control signal for controlling pump laser 702 for mode locked laser 704.

In various embodiments, the waveplate frequency shifter serves as a fast modulator of the $f_{ceo}$ external to the laser cavity while a current adjustment of the pump laser provides a slow, long-throw actuator, reducing the bandwidth restrictions on the waveplate frequency shifter since adjustment of the pump current determines the average (i.e., low frequency) $f_{ceo}$ value, or the frequency shifter may be utilized alone in order to provide the requisite control. In some embodiments, utilizing the frequency shifter alone requires the rotational frequency of the waveplate to be broadly tunable over a large frequency range (i.e., ~100 MHz or more generally a frequency range that corresponds to half of the pulse train repetition rate).

Figure 8:
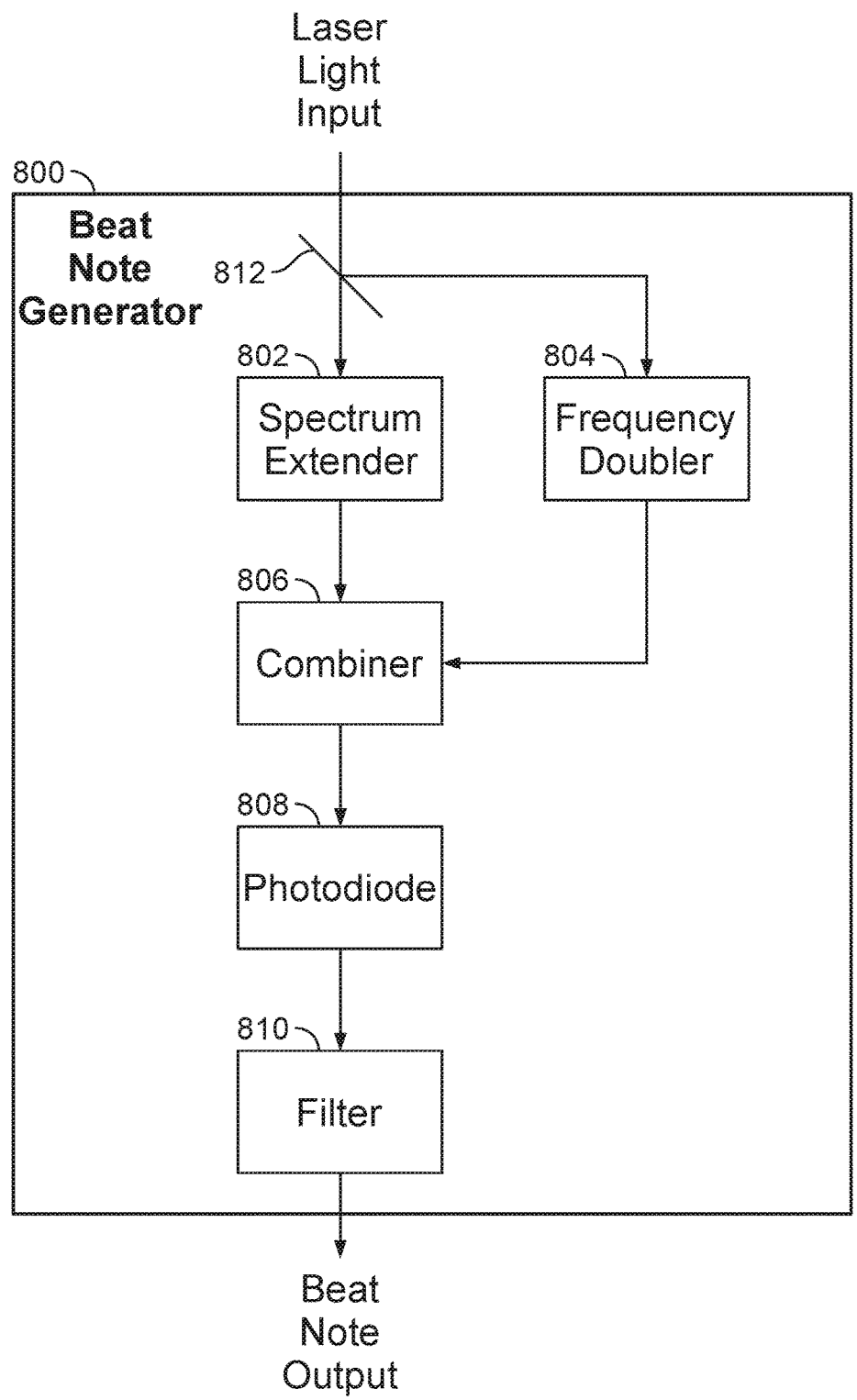
FIG. 8 is a block diagram illustrating an embodiment of a beat note generator.

FIG. 8 is a block diagram illustrating an embodiment of a beat note generator. In some embodiments, beat note generator 800 comprises beat note generator 708 of FIG. 7. In the example shown, incoming laser light received by beat note generator 800 is split by beam splitter 812. A portion of the incoming light is received by spectrum extender 802 and a portion of the incoming light is received by frequency doubler 804. Spectrum extender 802 comprises a spectrum extending optical element (e.g., a nonlinear fiber, a photonic crystal fiber) for increasing the light intensity at higher frequencies. In some embodiments, the laser light intensity at higher frequencies is already high enough and spectrum extender 802 is not used. Frequency doubler 804 comprises a frequency doubler (e.g., a frequency doubling crystal) for doubling the light frequency (e.g., without changing the envelope frequency, thus doubling the carrier envelope offset frequency). Light from spectrum extender 802 and frequency doubler 804 is combined using combiner 806. In some embodiments, combiner 806 comprises a beam splitter combiner. In some embodiments, combiner 806 comprises guiding light from spectrum extender 802 and frequency doubler 804 onto the same spot on photodiode 808. Photodiode 808 comprises a photodiode for converting a light intensity into an electrical signal. In some embodiments, when light from spectrum extender 802 and frequency doubler 804 is combined, the lowest frequency component comprises a beat note at the carrier envelope offset frequency. Higher frequency components are removed by filter 810 and a beat note output is created comprising the carrier envelope offset frequency. In some embodiments, the beat note generator generates the beat note by determining a frequency difference between a spectrum extended version of the frequency shifted laser output and a frequency doubled version of the frequency shifted laser output. In some embodiments, the beat note generator generates the beat note by determining a frequency difference between the frequency shifted laser output and a frequency doubled version of the frequency shifted laser output.

Figure 9:
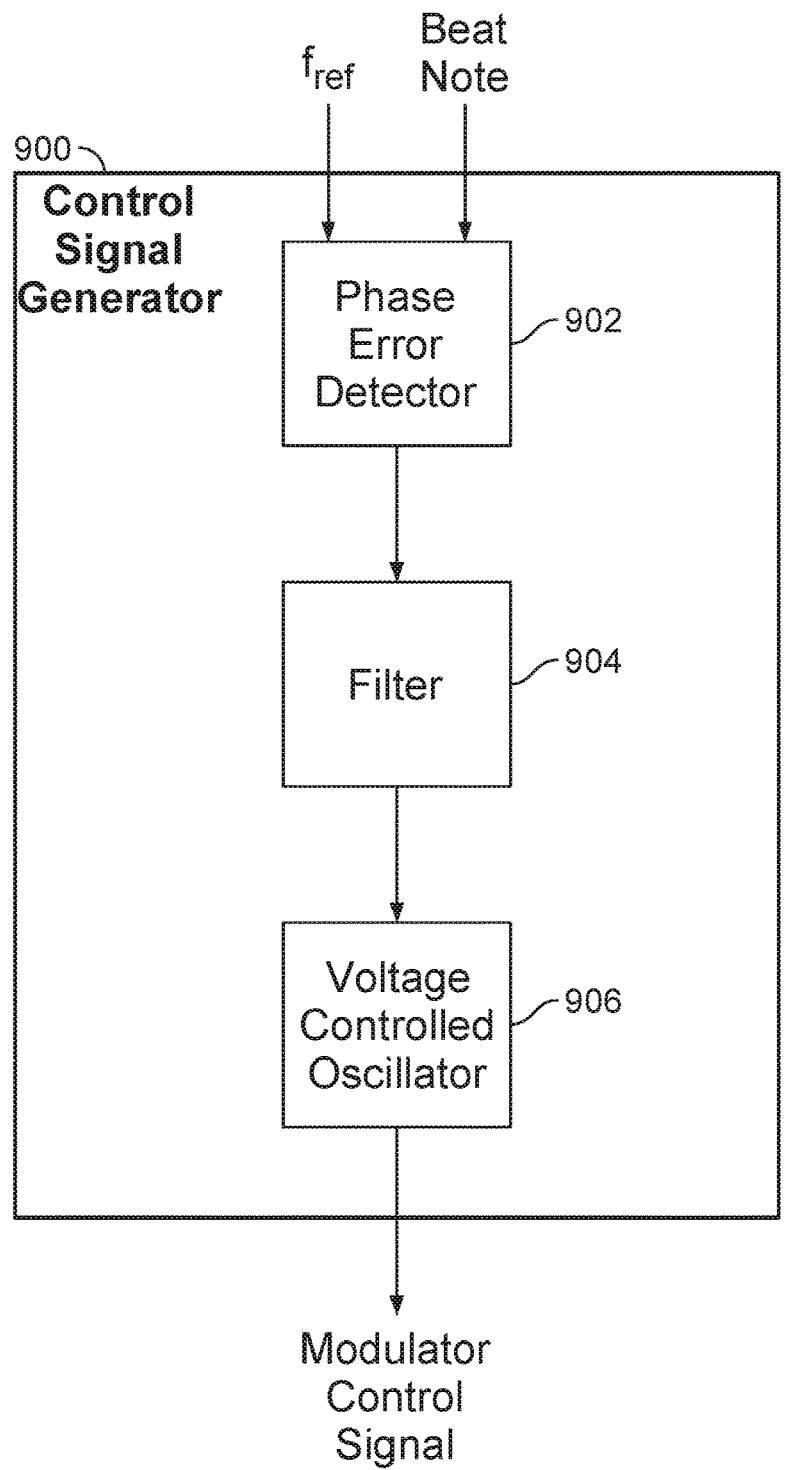
FIG. 9 is a block diagram illustrating an embodiment of a control signal generator.

FIG. 9 is a block diagram illustrating an embodiment of a control signal generator. In some embodiments, control signal generator 900 comprises control signal generator 710 of FIG. 7. In some embodiments, control signal generator 900 comprises a phase-locked loop. In the example shown, control signal generator 900 receives a reference frequency comprising a desired carrier envelope offset frequency and a beat note comprising a measured carrier envelope offset frequency. Phase error detector 902 comprises a phase error detector for producing an output signal related to the phase difference between the input signals. In some embodiments, phase error detector 902 is a phase/frequency error detector. Filter 904 comprises a filter for filtering the phase error detector output. In some embodiments, filter 904 comprises a filter for stabilizing a control loop. In some embodiments, filter 1004 comprises a servo control filter that includes gain. Filter 904 produces a signal for controlling voltage-controlled oscillator 906. In some embodiments, voltage controlled oscillator 906 comprises a plurality of voltage-controlled oscillators.

Figure 10:
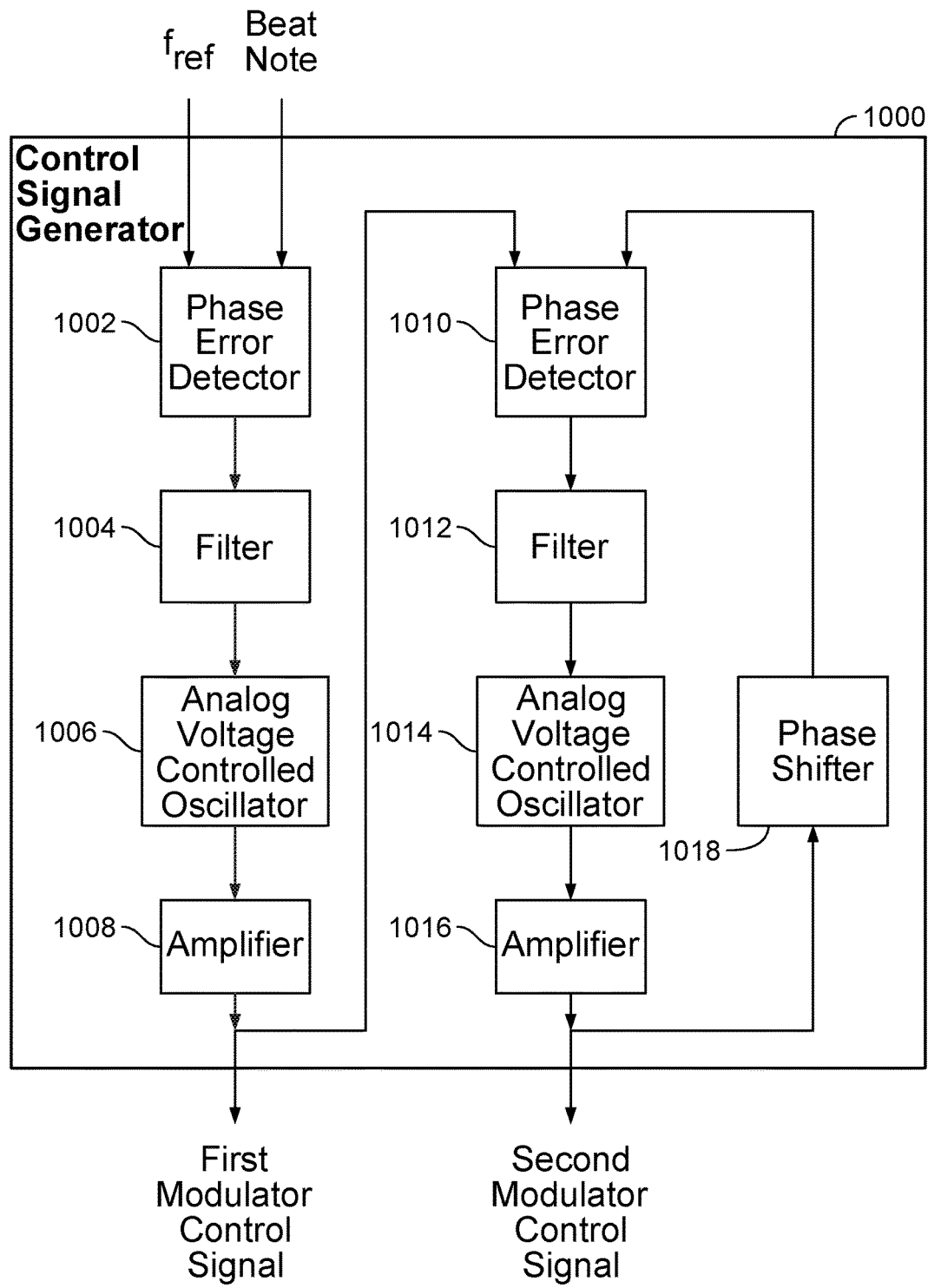
FIG. 10 is a block diagram illustrating an embodiment of a control signal generator.

FIG. 10 is a block diagram illustrating an embodiment of a control signal generator. In some embodiments, control signal generator 1000 comprises control signal generator 710 of FIG. 7. In the example shown, control signal generator comprises phase error detector 1002 for producing an output signal related to the phase difference between the input signals and filter 1004 for filtering the output signal from phase error detector 1002. In some embodiments, phase error detector 1002 is a phase/frequency error detector. In some embodiments, filter 1004 comprises a filter for stabilizing a control loop. In some embodiments, filter 1004 comprises a servo control filter that includes gain. The output signal from filter 1004 controls analog voltage controlled oscillator 1006 (e.g., a voltage controlled oscillator implemented using analog electronics). A first phase-locked loop is comprised of phase error detector 1002, filter 1004, and analog voltage controlled oscillator 1006. Amplifier 1008 amplifies the signal produced by analog voltage controlled oscillator 1006 for use as a first modulator control signal. The signal produced by analog voltage controlled oscillator 1006 and amplified by amplifier 1008 is additionally provided to phase error detector 1010. In some embodiments, phase error detector 1010 is a phase/frequency error detector. A second phase-look loop is comprised of phase error detector 1010, filter 1012, and analog voltage controlled oscillator 1014. Phase shifter 1018 is in the feedback path of the second phase-locked loop, receiving the output of analog voltage controlled oscillator 1014 as amplified by amplifier 1016 and providing input to phase error detector 1010. The output of the second phase-locked loop (e.g., the output of analog voltage controlled oscillator 1014) comprises a phase-shifted version of the output of the first phase-locked loop (e.g., by the negative of the phase shift provided by phase shifter 1018). In some embodiments, the second phase-locked loop is used to generate a second sinusoidal control signal for an electro-optic crystal (e.g., electro-optic crystal 500 of FIG. 5). Amplifier 1016 amplifies the signal produced by analog voltage controlled oscillator 1014 for use as a second modulator control signal.

Figure 11:
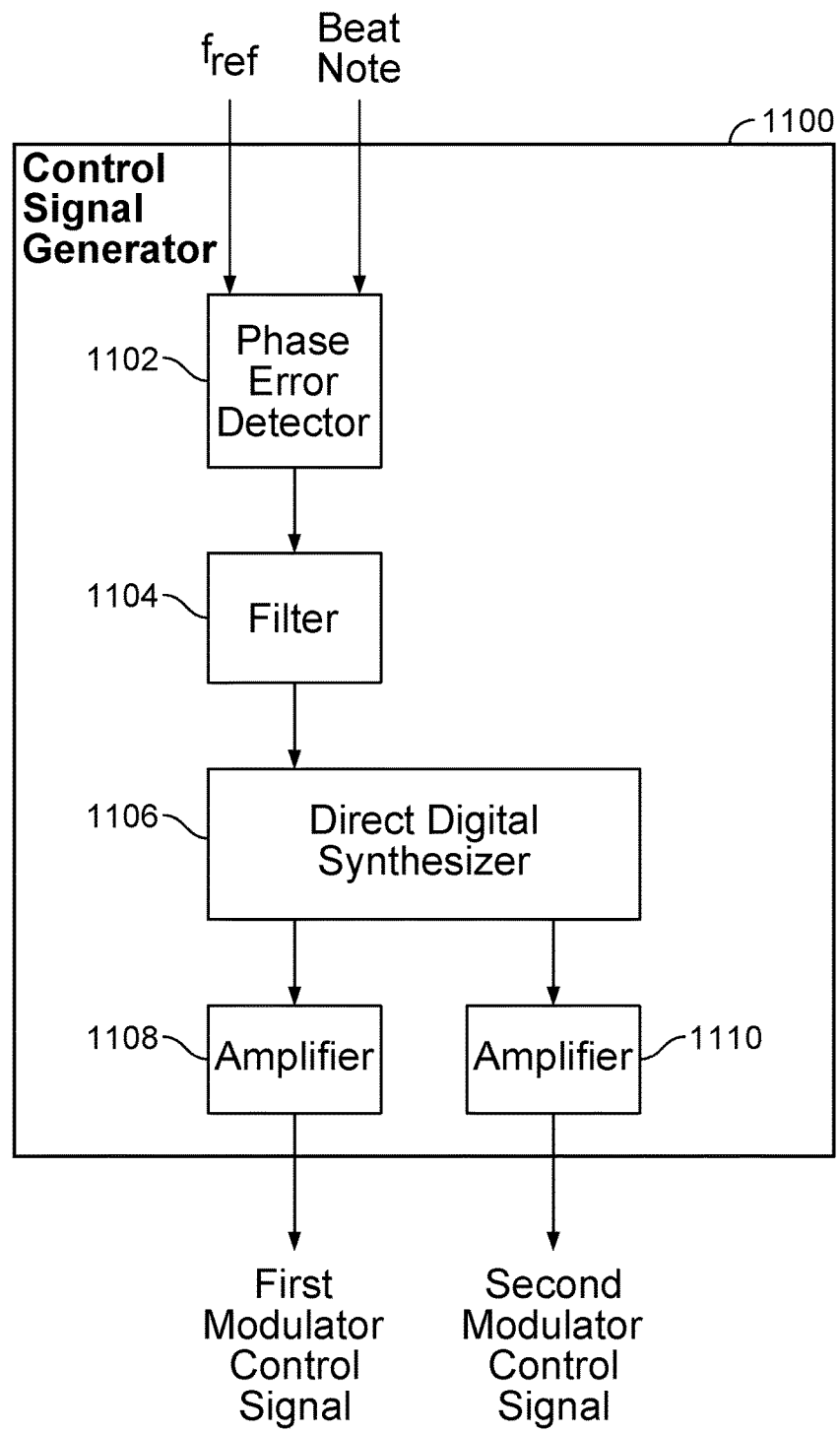
FIG. 11 is a block diagram illustrating an embodiment of a control signal generator.

FIG. 11 is a block diagram illustrating an embodiment of a control signal generator. In some embodiments, control signal generator 1100 comprises control signal generator 710 of FIG. 7. In the example shown, control signal generator comprises phase error detector 1102 for producing an output signal related to the phase difference between the input signals and filter 1104 for filtering the output signal from phase error detector 1102. In some embodiments, phase error detector 1102 is a phase/frequency error detector. In some embodiments, filter 1104 comprises a filter for stabilizing a control loop. In some embodiments, filter 1104 comprises a servo control filter that includes gain. The output signal from filter 1104 controls direct digital synthesizer 1106. Direct digital synthesizer 1106 comprises a digital synthesizer for generating an oscillating signal directly from a digital control signal. In the example shown, direct digital synthesizer 1106 is configured to produce two oscillating signals (e.g., of the same frequency and with a phase offset). Amplifier 1108 amplifies the first signal produced by direct digital synthesizer 1106 for use as a first modulator control signal and amplifier 1110 amplifies the second signal produced by direct digital synthesizer 1106 for use as a second modulator control signal. In some embodiments, the direct digital synthesizer 1106 generates the reference frequency and its clock is derived from some external system clock.

Figure 12:
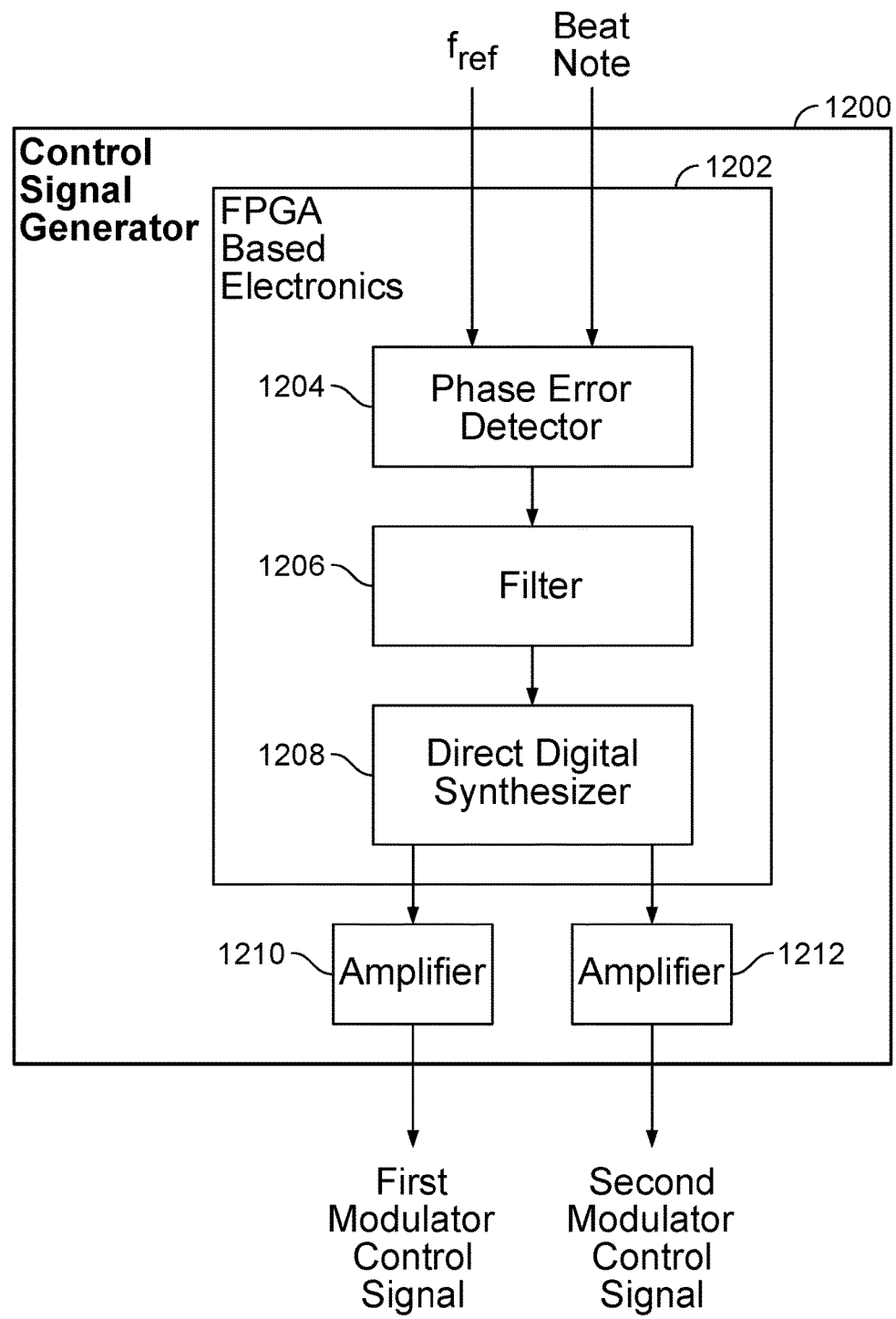
FIG. 12 is a block diagram illustrating an embodiment of a control signal generator.

FIG. 12 is a block diagram illustrating an embodiment of a control signal generator. In some embodiments, control signal generator 1200 comprises control signal generator 710 of FIG. 7. In the example shown, control signal generator 1200 comprises field programmable gate array (e.g., FPGA) based electronics 1202. FPGA based electronics 1202 comprises phase error detector 1204 for producing an output signal related to the phase difference between the input signals, filter 1206 for filtering the output signal from phase error detector 1204, and direct digital synthesizer 1208. In some embodiments, analog to digital converters convert inputs to the phase detector into digital signals for inputting into phase error detector 1204. In some embodiments, phase error detector 1204 is a phase/frequency error detector. Direct digital synthesizer 1208 produces two oscillating signals (e.g., of the same frequency and with a phase offset). Amplifier 1210 amplifies the first signal produced by direct digital synthesizer 1208 for use as a first modulator control signal and amplifier 1212 amplifies the second signal produced by direct digital synthesizer 1208 for use as a second modulator control signal. In some embodiments, filter 1206 comprises a filter for stabilizing a control loop. In some embodiments, filter 1206 comprises a servo control filter that includes gain. In some embodiments, $f_{ref}$ is internally generated by the FPGA system clock (just like the DDS channels used in the outputs). In this case, the FPGA system clock is usually referenced to the external overall system clock.

Figure 13:
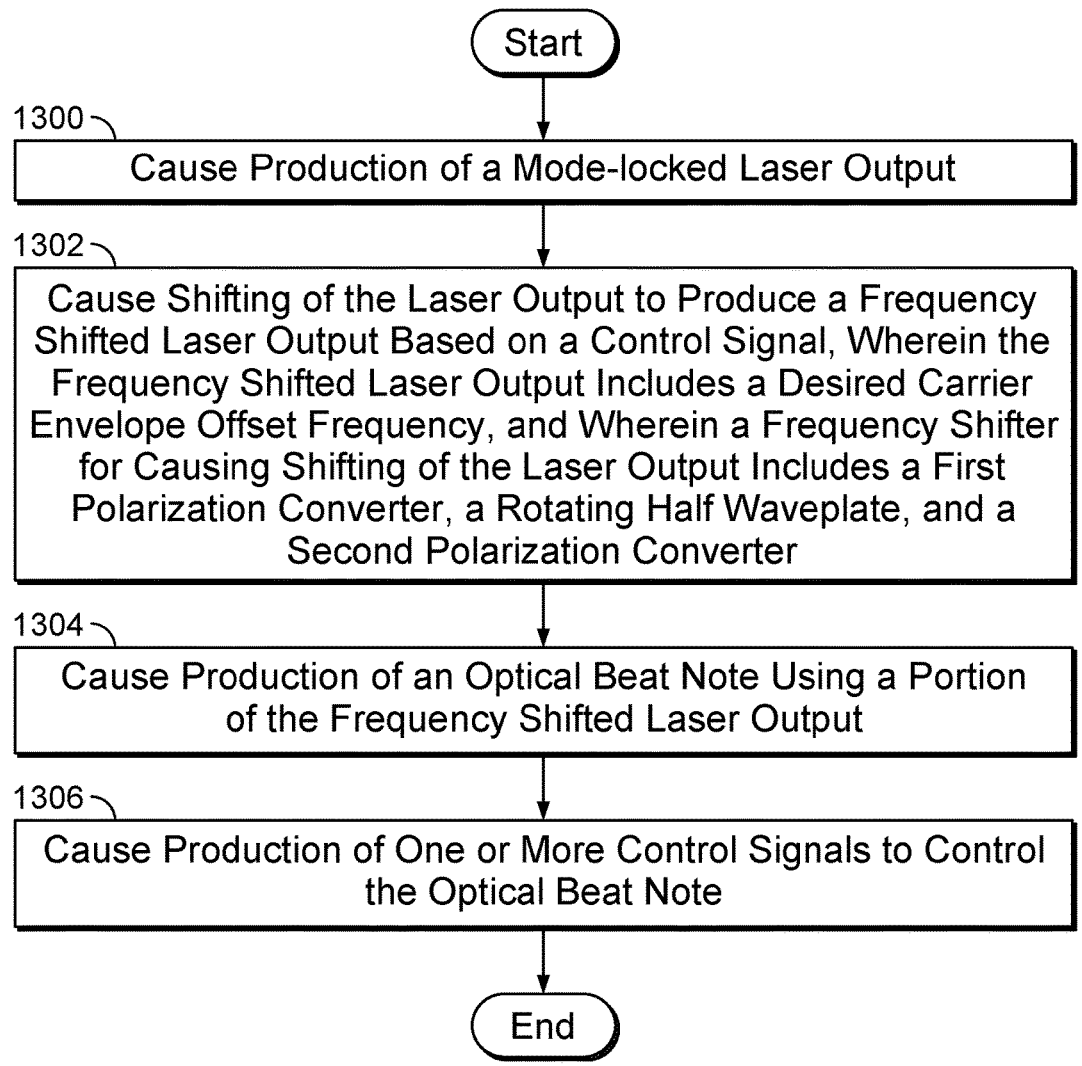
FIG. 13 is a flow diagram illustrating an embodiment of a process for optical comb carrier envelope offset frequency control.

FIG. 13 is a flow diagram illustrating an embodiment of a process for optical comb carrier envelope offset frequency control. In some embodiments, the process of FIG. 13 is executed by mode-locked laser with closed-loop frequency shifter 700 of FIG. 7. In the example shown, in 1300, production of a mode-locked laser output is caused. In 1302, shifting of the laser output is caused to produce a frequency shifted laser output based on a control signal, wherein the frequency shifted laser output includes a desired carrier envelope offset frequency, and wherein a frequency shifter for causing shifting of the laser output includes a first polarization converter (e.g., a quarter-wave plate), a rotating half-wave plate, and a second polarization converter (e.g., a quarter-wave plate). In 1304, production of an optical beat note using a portion of the frequency shifted laser output is caused. In 1306, production of one or more control signals to control the optical beat note is caused. In some embodiments, the mode-locked laser output, the frequency shifter, the optical beat note generator, and pump laser modules are disposed so that carrier envelope offset frequency is controlled. In some embodiments, the mode-locked laser output, the frequency shifter, the optical beat note generator, and pump laser modules are fiber coupled.

In various embodiments, loop filter (e.g., filter 1004 and filter 1012 of FIG. 10, filter 1104 of FIG. 11, etc.) is implemented using analog electronics, digital electronics, or a combination of both. Analog electronics provide low latency components to implement gain, zeroes and poles in the loop transfer function and allow for loop bandwidths in excess of 1 MHz A typical analog filter might include several poles and zeroes to implement proportional gain, one or two integrators and a differentiator. Digital implementations of a loop filter (e.g., filter 1004 and filter 1012 of FIG. 10, filter 1104 of FIG. 11, filter 1206 of FIG. 12, etc.) suffer from latencies associated with analog-to-digital conversion and processing time and are limited to loop bandwidths <1 MHz. However, they provide more flexibility in the implementation of the loop filter since it is much easier to add additional poles and zeroes or move the location of the poles and zeroes to optimize the loop filter transfer function. Moreover, digital implementation of phase detectors allow for essentially an unlimited range of phase sensitivity (since they can unwrap $2\pi$ phase ambiguities) for improved robustness against perturbations. Finally, digital implementations allow for auto-locking routines where a digital frequency counter counting the frequency of the beatnote can be used to steer the beatnote frequency onto the reference frequency and engage the lock automatically when the difference is within the capture range of the servo.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for optical comb carrier envelope offset frequency control, comprising:
    a mode-locked laser, wherein the mode-locked laser produces a laser output; and
    a frequency shifter, wherein the frequency shifter shifts the laser output to produce a frequency shifted laser output based at least in part on one or more control signals, wherein the frequency shifted laser output comprises a controlled carrier envelope offset frequency, and wherein the frequency shifter comprises a first polarization converter, a rotating half-wave plate, and a second polarization converter.

2. The system of claim 1, wherein the first polarization converter comprises a quarter-wave plate.

3. The system of claim 1, wherein the second polarization converter comprises a quarter-wave plate.

4. The system of claim 1, further comprising:
    a beat note generator, wherein a portion of the frequency shifted laser output is used to produce an optical beat note; and
    a control signal generator, wherein the control signal generator produces the one or more control signals to control the optical beat note.

5. The system of claim 4, wherein the one or more control signals control(s) the rotation of the rotating half-wave plate.

6. The system of claim 4, wherein the optical beat note is converted to an electrical signal using a photodetector.

7. The system of claim 4, wherein stabilizing the optical beat note comprises controlling the optical beat note frequency to match a reference frequency.

8. The system of claim 7, wherein the reference frequency comprises the desired comb carrier offset frequency.

9. The system of claim 4, wherein stabilizing the optical beat note comprises stabilizing a phase-locked loop, wherein the phase-locked loop includes a reference frequency.

10. The system of claim 4, wherein the control signal comprises a frequency such that the optical beat note is phase locked to a reference frequency.

11. The system of claim 10, wherein the control signal comprises one or more control voltages for applying one or more electric fields to an electro-optic polarization controller.

12. The system of claim 4, wherein the beat note generator generates the beat note by determining a frequency difference between the frequency shifted laser output and a frequency doubled version of the frequency shifted laser output.

13. The system of claim 4, wherein the control signal generator comprises a phase-locked loop.

14. The system of claim 13, wherein the phase-locked loop is implemented using an analog voltage-controlled oscillator for creating a first control signal.

15. The system of claim 14, wherein a second phase-locked loop is used to create a second control signal with a specific phase offset to the first control signal.

16. The system of claim 15, wherein the phase-locked loop is implemented using a direct digital synthesizer or a numerically controlled oscillator.

17. The system of claim 16, wherein the direct digital synthesizer is controlled using a digital controller implemented using a field programmable gate array.

18. The system of claim 16, wherein the direct digital synthesizer is implemented using a field programmable gate array.

19. The system of claim 4, wherein the control signal generator produces a control signal for controlling a pump laser for the mode locked laser.

20. The system of claim 1, wherein the rotating half-wave plate comprises an electro-optic polarization controller.

21. The system of claim 20, wherein one or more control signals cause(s) the electro-optic polarization controller to emulate the rotating half-wave plate.

22. The system of claim 20, wherein the electro-optic polarization controller comprises a Pockels cell.

23. The system of claim 20, wherein the electro-optic polarization controller comprises a fiber-optic or waveguide polarization controller.

24. A method for optical comb carrier envelope offset frequency control, comprising:
  causing, using a processor, production of a mode-locked laser output; and
  causing shifting of the laser output to produce a frequency shifted laser output based at least in part on one or more control signals, wherein the frequency shifted laser output comprises a controlled carrier envelope offset frequency, and wherein a frequency shifter for causing shifting of the laser output comprises a first polarization converter, a rotating half-wave plate, and a second polarization converter.

25. A computer program product for optical comb carrier envelope offset frequency control, the computer program product being embodied in a non-transitory computer readable storage medium and comprising computer instructions for:
  causing production of a mode-locked laser output; and
  causing shifting of the laser output to produce a frequency shifted laser output based at least in part on one or more control signals, wherein the frequency shifted laser output comprises a controlled carrier envelope offset frequency, and wherein a frequency shifter for causing shifting of the laser output comprises a first polarization converter, a rotating half-wave plate, and a second polarization converter.

* * * * *